(12) United States Patent
Elkins

(10) Patent No.: US 6,206,613 B1
(45) Date of Patent: Mar. 27, 2001

(54) CONFIGURABLE SUPPORT APPARATUS FOR FLEXIBLE PIPE AND METHOD

(76) Inventor: Michael L. Elkins, 12803 Julian Ave., Lakeside, CA (US) 92040

( * ) Notice: Subject to any disclaimer, the term of this patent is extended or adjusted under 35 U.S.C. 154(b) by 0 days.

(21) Appl. No.: 09/307,024

(22) Filed: May 7, 1999

Related U.S. Application Data

(63) Continuation of application No. 09/046,471, filed on Mar. 23, 1998, now abandoned, which is a continuation-in-part of application No. 08/870,169, filed on Jun. 6, 1997.

(51) Int. Cl.[7] ........................................ F16L 1/00
(52) U.S. Cl. .............................. 405/157; 405/172; 248/49
(58) Field of Search .................................... 405/154, 157, 405/172; 248/49, 68.1, 80

(56) References Cited

U.S. PATENT DOCUMENTS

| | | | |
|---|---|---|---|
| 675,104 | * | 5/1901 | Oberle ........................................ 248/49 |
| 2,684,222 | * | 7/1954 | Miller ........................................ 248/49 |
| 3,115,726 | * | 12/1963 | Sayles ...................................... 405/154 |
| 3,809,348 | * | 5/1974 | Di Laura .................................. 248/49 |
| 4,244,542 | * | 1/1981 | Mathews .................................. 248/68.1 |
| 4,406,434 | * | 9/1983 | Schneckloth ............................. 248/49 |
| 4,407,472 | * | 10/1983 | Beck ........................................ 248/68.1 |
| 5,871,306 | * | 2/1999 | Tilcox ...................................... 405/157 |
| 5,906,341 | * | 5/1999 | Brown ...................................... 248/49 |

* cited by examiner

Primary Examiner—Eileen D. Lillis
Assistant Examiner—Frederick L Lagman
(74) Attorney, Agent, or Firm—Henri J. A. Charmasson; John D. Buchaca

(57) ABSTRACT

A series of height-adjustable pipe-supports are used to lay a flexible conduit such as the sewer line of a recreation vehicle at a gradually decreasing slant above a ground surface. Gutter segments are also used between the pipe and its supports to prevent sagging between them. Each support comprises a substantially hemispherical clamp mounted on a threaded rod that can be adjusted screwed into a pedestal. An intermediary extension can be interposed between the clamp and the pedestal to provide additional height.

8 Claims, 2 Drawing Sheets

CONFIGURABLE SUPPORT APPARATUS FOR FLEXIBLE PIPE AND METHOD

PRIOR APPLICATION

This is a continuation of application Ser. No. 09/046,471 filed Mar. 23, 1998, now abandoned, a continuation-in-part of copending application Ser. No. 08/870,169 filed Jun. 6, 1997.

FIELD OF THE INVENTION

This invention relates to devices for laying and stabilizing pipes and conduits, and more specifically to devices for supporting a flexible piping installation such as waste lines temporarily strung between the sewer outlet of a recreation vehicle and a dump inlet.

BACKGROUND OF THE INVENTION

It is imperative that pipes designed to evacuate sewage and waste from a site be laid in a vertically linear fashion in order to avoid siphons and pockets into which the sewage can be trapped, settle and eventually clog the pipe. This requirement is particularly critical for flexible pipes which are used, often in a temporary fashion, to carry waste from a recreational vehicle storage tank into a dump reservoir or public sewer line. If the recreational vehicle is to remain for a certain time in a campsite or similar facility provided with sewer inlet, it is desirable that the sewer connection to the recreational vehicle be laid in a stable and sturdy, yet quickly removable manner. The common practice has been for campers and recreational vehicle enthusiasts to prop their sewer lines with bricks, wood blocks and other ad hoc implements. Those installations are subject to be kicked out of alignment, and are prone to sag between support points.

In many camping sites, connection to utilities such as water and electricity are often provided near the sewer inlet. It is therefore customary to run a water line or electrical cable along the sewer pipe toward the vehicle. The accumulation of these various lines and conduits not only can lead to unsightly and problematic entanglements, but also constitute tripping hazards, and raise other safety concerns.

The present invention results from an attempt to address these various aforesaid shortcomings.

SUMMARY OF THE INVENTION

The principal and secondary objects of this invention are to provide a convenient, and quickly installable and removable means for laying a temporary, flexible piping installation at a desired gradual descent above a ground surface, and to achieve a certain degree of stability while preventing low points in the line where liquid such as sewer waste can accumulate, as well as to provide a means to conveniently run together a plurality of conduits in an orderly and attractive fashion.

These and other objects are achieved by means of a series of components comprising a plurality of height-adjustable pipe-supports whose heads are in the form of circular clamps designed to securely hold a pipe. Gutter channels are also provided to span two adjacent supports and prevent sagging of the supported pipe therebetween. The height of the supports can be increased by use of a convenient extension interposed between the clamping head and the support footing.

DESCRIPTION OF THE PREFERRED EMBODIMENT OF THE INVENTION

Figure 1:
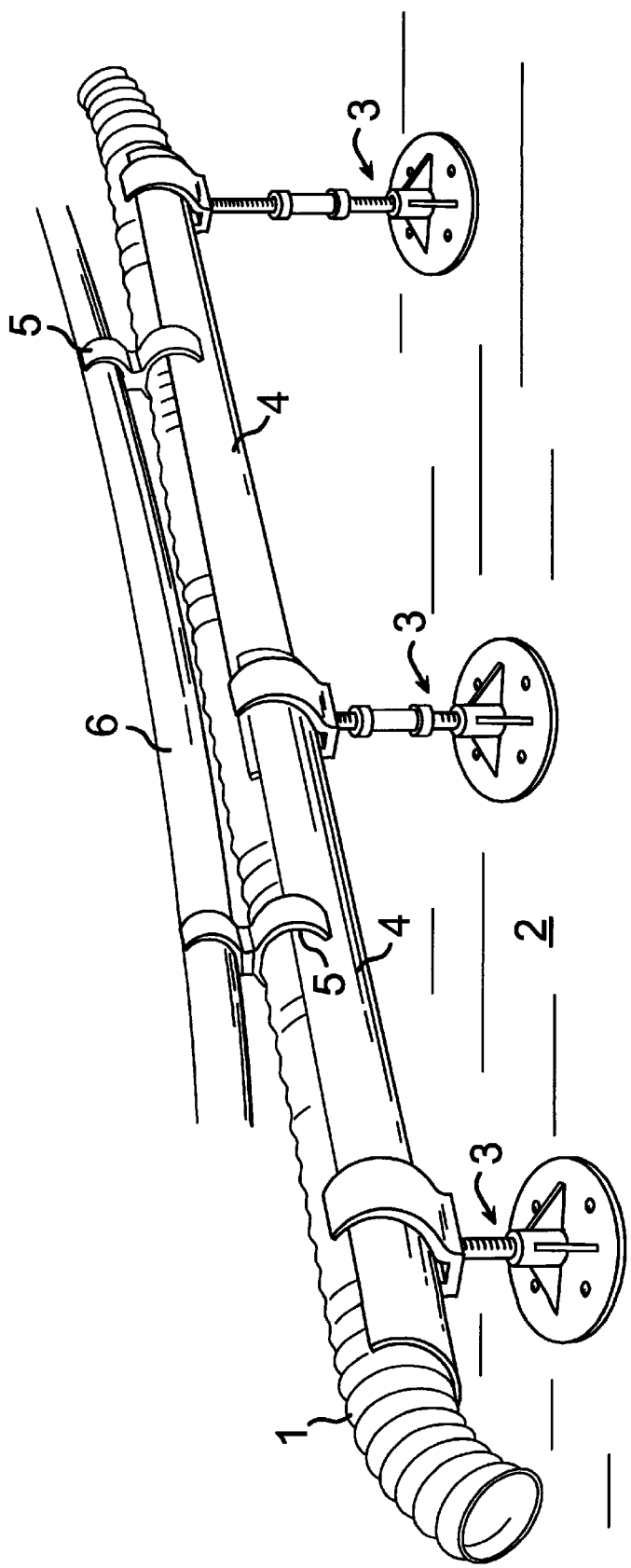
FIG. 1 is a perspective view of a system for supporting a flexible pipe according to the invention.

Referring now to the drawing, there is shown in FIG. 1, a plurality of components or kit that can be used for laying and supporting a flexible pipe 1 above a ground surface 2 at a desired height and pitch angle. This preferred embodiment of the invention is specifically designed to support a waste line between the sewer outlet of a recreational vehicle and a sewer drain opening.

The kit comprises a plurality of pipe supports 3 whose heights are adjusted into a progressively decreasing sequence. A series of gutter elements 4 with overlapping ends are shaped and dimensioned to conveniently rest upon the pipe supports 3 and to receive and hold the flexible pipe 1. A series of double-headed clamps 5 are shaped and dimensioned to clamp over the pipe 1 and over an auxiliary conduit 6 such as a water line or electrical cable running along the flexible pipe 1.

Figures 2, 3:
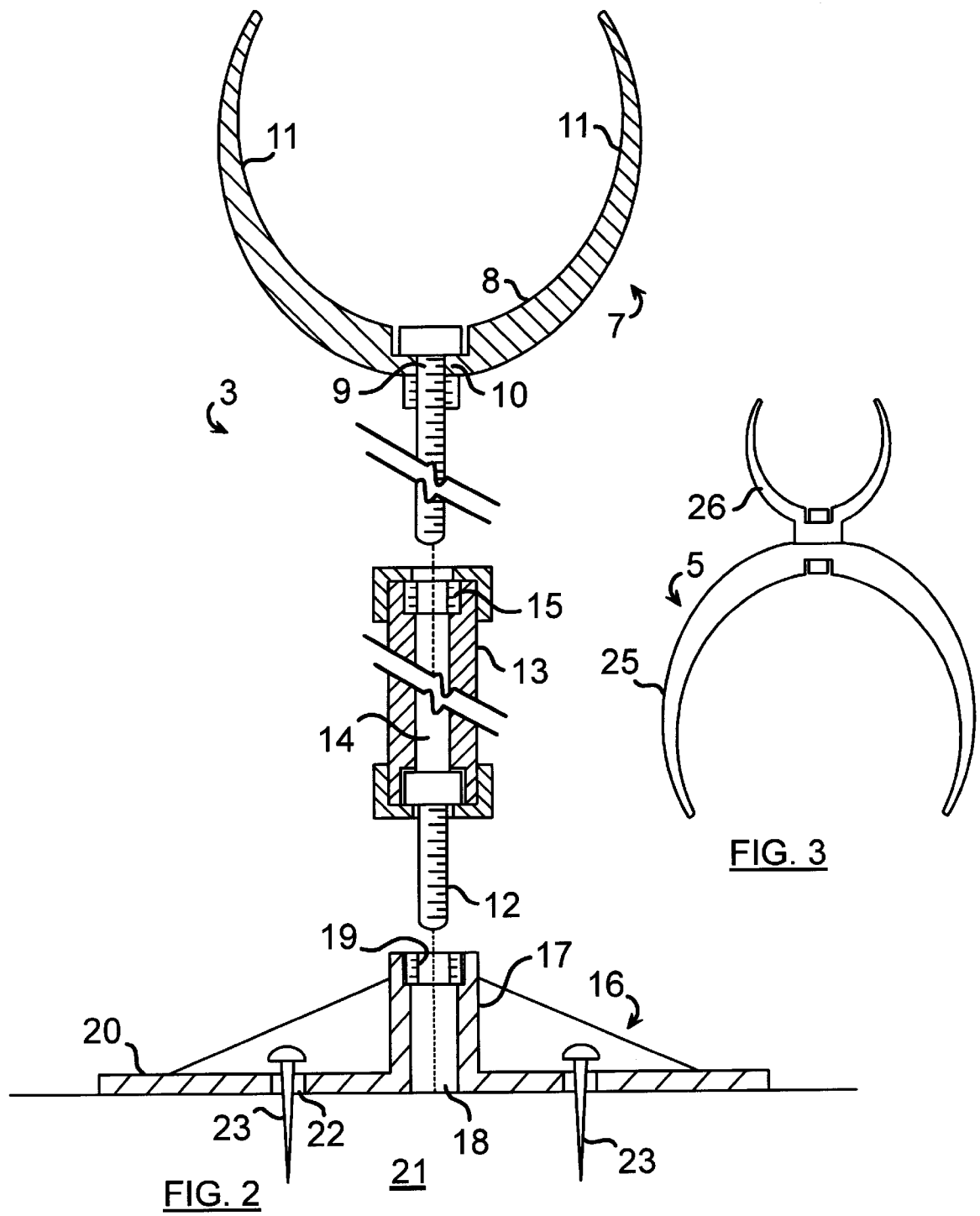
FIG. 2 is an exploded, cross-sectional view of an adjustable pipe support.
FIG. 3 is a front elevational view of an auxiliary conduit clamp.

As more specifically illustrated in FIG. 2, each pipe support 3 comprises a supporting head 7 having an upper inner surface 8 shaped and dimensioned to intimately hold the flexible pipe 1 or other tubular structure. Projecting downwardly from the undersurface of the supporting head, is a threaded shaft 9 consisting essentially of a bolt passing through, and secured to the central portion 10 of the supporting head. Projecting upwardly and astride from said central portion 10, are two arcuate and symmetrical prongs 11 which are shaped and dimensioned to form a substantially circular cradling area having a diameter slightly inferior to the diameter of the flexible pipe 1. The entire supporting head 7 is made from a resiliently flexible material such as PVC so that the prongs 11 can be forced apart from one another by the insertion of the flexible pipe 1, then resiliently clamped intimately around said pipe.

A tubular extension 13 has an axial, central channel 14 which has threads 15 along a portion of its length to be engaged by the shaft 9. A second threaded shaft 12 projects axially from the opposite, lower end of the channel 14. A pedestal 16 comprises a hub or pillar 17 having a central axial channel 18 with threads 19 over a part of its length, and a circular flange or base 20 having a flat under surface for contact with the ground 21. The flange 20 has a plurality of holes 22 through which spikes 23 can be driven into the ground to stabilize and immobilize the entire pipe support structure. The two shafts 9, 12 and the threaded portions 15, 18 of the axial channels in the extension and in the base hub are all commensurate so that the supporting head 7 can either be adjustably and directly screwed directly into the base 16 or into the extension 13, and the extension itself screwed into the base 16. This arrangement provides for a wide range of height adjustments using one or more tubular extensions or none at all. In the specific embodiment, using one tubular extension that range extends from approximately 7.5 centimeters to 20 centimeters (3 to 8 inches).

Figure 4:
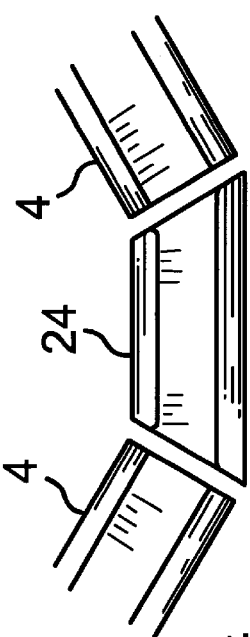
FIG. 4 is a top plan view of a series of gutter elements arranged for supporting a bending pipe section.

The gutter elements 4 are indicated for supporting a flexible pipe that, without such element, would have a tendency to sag between adjacent pipe supports. The gutter elements are preferably made of a resiliently flexible material such as polypropylene and have a cross-section that defines and arc of approximately 250 degrees in order to impart some horizontal as well as vertical rigidity to the flexible pipe 1. As illustrated in FIG. 4, one or more sections 24 of the gutter elements may be end-cut at an oblique angle in order to accommodate an horizontal bend in the supported pipe.

As more specifically illustrated in FIG. 3, the double-headed clamp 5 mounts back-to-back two clamping jaws 25, 26 of the same general shape, but different sizes. The lower clamping jaw 25 is shaped and dimensioned to conveniently and intimately clamp over the waste pipe 1 while the upper clamping jaw is shaped and dimensioned to cradle the auxiliary conduit 6. The entire clamp assembly is preferably made of resiliently flexible material such as PVC and the cradling area of each clamp is slightly smaller than the pipe or conduit to which it attaches.

While the preferred embodiment of the invention has been described, modifications can be made and other embodiments may be devised without departing from the spirit of the invention and the scope of the appended claims.

What is claimed is:

1. A height-adjustable pipe-support which comprises:

a supporting head having an upper surface shaped and dimensioned to intimately hold a tubular structure, and an under surface;

a threaded first shaft protecting from said under surface;

a pedestal having a base shaped for stable contact with a support surface, and a pillar projecting upwardly from said base, said pillar having an axial, threaded first channel commensurate with said first shaft;

whereby said first shaft can be adjustably screwed into said pillar first channel to place said first support head at a desired height over said support surface; and an intermediary, oblong extension having a threaded second shaft commensurate with said first shaft projecting axially from a first end, and an axial, threaded channel commensurate with said first channel opening at an opposite end thereof;

whereby said extension can be adjustably inserted between said support head and said base.

2. The structure of claim 1, wherein said support head comprises:

a central portion; and first and second prongs extending upwardly from and astride said central portion to define a cradling area, at least one of said prongs being resiliently bendable away from the other.

3. The structure of claim 2, wherein said central portion and said prongs are shaped to define a circular cradling area.

4. A kit for laying a pipe of given outer diameter at a desired pitch angle over a ground surface, said kit comprising a plurality of height-adjustable pipe supports;

wherein each of said supports comprises:

a supporting head having an upper surface shaped and dimensioned to intimately hold a tubular structure, and an under surface;

a threaded first shaft protecting from said under surface;

a pedestal having a base shaped for stable contact with a support surface, and a pillar protecting upwardly from said base, said pillar having an axial, threaded first channel commensurate with said first shaft;

whereby said first shaft can be adjustably screwed into said pillar first channel to place said first support head at a desired height over said support surface; and an intermediary, oblong extension having a threaded second shaft commensurate with said first shaft projecting axially from a first end, and an axial, threaded channel commensurate with said first channel opening at an opposite end thereof;

whereby said extension can be adjustably inserted between said support head and said pedestal.

5. The kit of claim 4, wherein said support head comprises:

a central portion; and first and second prongs extending upwardly from an astride central portion to define a cradling area, at least one of said prongs being resiliently bendable away from the other.

6. The kit of claim 5, wherein said central portion and said prongs are shaped to define a circular cradling area.

7. The kit of claim 4, which further comprises:

at least one gutter element having an arcuate cross-section and an open top;

said gutter element having an outer diameter dimensioned to intimately contact the upper surface of said support head, and an inner diameter substantially commensurate with said pipe outer diameter;

whereby a flexible pipe can be linearly supported by a length of said gutter element mounted over at least one of said pipe supports.

8. The kit of claim 4, which further comprises:

at least one secondary conduit clamp;

said clamp comprising:

a central section;

first and second substantially symmetrical and arcuate prongs projecting from and astride said central section in a first common direction to define a substantially circular first clamping area; and third and fourth, substantially commensurate symmetrical and arcuate prongs projecting from and astride said central section in a second direction opposite said first direction to define a substantially circular second clamping area;

whereby said clamp can be used to attach a secondary conduit to said pipe.

* * * * *